United States Patent
Song et al.

(10) Patent No.: US 9,964,814 B2
(45) Date of Patent: May 8, 2018

(54) LIQUID-CRYSTAL DISPLAY DEVICE

(71) Applicant: Samsung Display Co. Ltd., Yongin-si (KR)

(72) Inventors: Dong Han Song, Hwaseong-si (KR); Su Jin Kim, Seoul (KR); Dong Chul Shin, Seoul (KR); Ki Chul Shin, Seongnam-si (KR); Ho Kil Oh, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days. days.

(21) Appl. No.: 15/403,274

(22) Filed: Jan. 11, 2017

(65) Prior Publication Data

US 2017/0235195 A1     Aug. 17, 2017

(30) Foreign Application Priority Data

Feb. 17, 2016    (KR) ........................ 10-2016-0018553

(51) Int. Cl.
| | | |
|---|---|---|
| *G02F 1/1343* | (2006.01) | |
| *G02F 1/1337* | (2006.01) | |
| *G02F 1/1362* | (2006.01) | |
| *G02F 1/1368* | (2006.01) | |

(52) U.S. Cl.
CPC ...... *G02F 1/134309* (2013.01); *G02F 1/1337* (2013.01); *G02F 1/1368* (2013.01); *G02F 1/134336* (2013.01); *G02F 1/136286* (2013.01); *G02F 2001/133742* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| | | | |
|---|---|---|---|
| 8,178,172 B2 | 5/2012 | Kim et al. | |
| 9,581,868 B2* | 2/2017 | Matsushima | ..... G02F 1/134363 |
| 9,869,906 B2* | 1/2018 | Park | ................. G02F 1/134309 |

(Continued)

FOREIGN PATENT DOCUMENTS

| | | |
|---|---|---|
| JP | 2013080241 | 5/2013 |
| KR | 1020100112422 | 10/2010 |

(Continued)

*Primary Examiner* — Ryan Crockett
(74) *Attorney, Agent, or Firm* — Cantor Colburn LLP

(57) ABSTRACT

A liquid-crystal display device includes a first substrate and a second substrate including pixels, a liquid-crystal layer interposed between the first and second substrates, pixel electrodes disposed on the first substrate, each of the pixel electrodes disposed in a pixel region of the respective pixels, and a common electrode overlapping the pixel electrodes, where each of the pixel electrodes includes, a stem electrode extended in a first direction and in a second direction intersecting the first direction to divide the pixel region into quadrants, the quadrants corresponding to first to fourth domains, respectively, first branch electrodes, second branch electrodes, third branch electrodes, a first in-between electrode, and a second in-between electrode, and where widths of the first to third branch electrodes are equal to one another, and widths of the first and second in-between electrodes increase as farther from the stem electrode.

20 Claims, 14 Drawing Sheets

(56) References Cited

U.S. PATENT DOCUMENTS

| | | | | |
|---|---|---|---|---|
| 2010/0259712 | A1* | 10/2010 | Jeong | G02F 1/134309 349/128 |
| 2012/0249940 | A1* | 10/2012 | Choi | G02F 1/133753 349/123 |
| 2013/0300991 | A1* | 11/2013 | Lim | G02F 1/13624 349/123 |
| 2016/0161803 | A1* | 6/2016 | Lee | G02F 1/133707 349/145 |

FOREIGN PATENT DOCUMENTS

| | | |
|---|---|---|
| KR | 1020130104830 | 9/2013 |
| KR | 1020130125638 | 11/2013 |

\* cited by examiner

US 9,964,814 B2
LIQUID-CRYSTAL DISPLAY DEVICE

This application claims priority to Korean Patent Application No. 10-2016-0018553, filed on Feb. 17, 2016, and all the benefits accruing therefrom under 35 U.S.C. § 119, the content of which in its entirety is herein incorporated by reference.

BACKGROUND

1. Field

Exemplary embodiments of the invention relate to a liquid-crystal display ("LCD") device.

2. Description of the Related Art

A liquid-crystal display ("LCD") device is one of the most commonly used flat display devices. An LCD device generally includes two substrates on which field generating electrodes such as a pixel electrode and a common electrode are formed, and a liquid-crystal layer disposed therebetween. An LCD device displays an image in such a manner that voltage is applied to field generating electrodes to generate electric field across a liquid-crystal layer, and liquid-crystal molecules in the liquid-crystal layer are aligned by the electric field so as to control the polarization of incident light.

Among various types of the liquid-crystal display, a vertically aligned ("VA") mode LCD device is under development in which liquid-crystal molecules are oriented such that their major axes are perpendicular to the upper and lower substrates when no electric field is applied.

In such a VA mode LCD device, a plurality of domains with different orientations of liquid crystals may be defined in a pixel in order to achieve wide viewing angle.

To form such a plurality of domains, cut portions such as fine slits may be defined in the field generating electrodes or protrusions may be formed on the field generating electrodes.

SUMMARY

A vertically aligned ("VA") mode liquid-crystal display ("LCD") device may have a poor side visibility, compared to a front visibility. Specifically, when a low gray scale image is presented, an image may be viewed brighter at the sides than at the front. The larger the difference in brightness is, the more visibility deteriorates. In order to improve the visibility, there has been proposed a structure in which a single pixel is divided into two sub-pixels with different voltage applied. Unfortunately, such structure desires additional opaque elements and thus transmittance deteriorates.

Under such circumstances, a pixel electrode structure that improves visibility without deteriorating transmittance is desired.

According to an exemplary embodiment of the invention, there is provided a liquid-crystal display device. The liquid-crystal display device includes a first substrate and a second substrate including pixels arranged in a matrix and facing each other, a liquid-crystal layer interposed between the first substrate and the second substrate, a plurality of pixel electrodes disposed on the first substrate, each of the pixel electrodes disposed in a pixel region of the respective pixels, and a common electrode overlapping the pixel electrodes, where each of the pixel electrodes includes, a stem electrode extended in a first direction and in a second direction intersecting the first direction to divide the pixel region into quadrants, the quadrants corresponding to first to fourth domains, respectively, a plurality of first branch electrodes extended from the stem electrode in each of the first to fourth domains in a direction oblique to the first direction and the second direction, a plurality of second branch electrodes extended from the stem electrode in each of the first to fourth domains in a direction different from the direction in which the first branch electrodes are extended, a plurality of third branch electrodes extended from the stem electrode in each of the first to fourth domains in a direction different from the directions in which the first branch electrodes and the second branch electrodes are extended, a first in-between electrode disposed between the first and second branch electrodes, and a second in-between electrode disposed between the second and third branch electrodes, and where widths of the first to third branch electrodes are equal to one another, and widths of the first and second in-between electrodes increase as farther from the stem electrode.

According to another exemplary embodiment of the invention, there is provided a liquid-crystal display device. The liquid-crystal display device includes a first substrate and a second substrate including pixels arranged in a matrix and facing each other, a liquid-crystal layer interposed between the first substrate and the second substrate, a plurality of pixel electrodes disposed on the first substrate, each of the pixel electrodes disposed in a pixel region of the respective pixels, and a common electrode overlapping the pixel electrodes, where each of the pixel electrodes includes, a stem electrode extended in a first direction and in a second direction intersecting the first direction to divide the pixel region into quadrants, the quadrants corresponding to first to fourth domains, respectively, a plurality of first branch electrodes extended from the stem electrode in each of the first to fourth domains in a direction oblique to the first direction and the second direction, a plurality of second branch electrodes extended from the stem electrode in each of the first to fourth domains in a direction different from the direction in which the first branch electrodes are extended, and a plurality of third branch electrodes extended from the stem electrode in each of the first to fourth domains in a direction different from the directions in which the first branch electrodes and the second branch electrodes are extended, and where a spacing distance between the first branch electrodes and the second branch electrodes increases as farther from the stem electrode, and a spacing distance between the second branch electrodes and the third branch electrodes increases as farther from the stem electrode.

According to another exemplary embodiment of the invention, there is provided a liquid-crystal display device. The liquid crystal display device includes a first substrate and a second substrate including pixels arranged in a matrix and facing each other, a liquid-crystal layer interposed between the first substrate and the second substrate, a plurality of pixel electrodes disposed on the first substrate, each of the pixel electrodes disposed in a pixel region of the respective pixels, and a common electrode overlapping the pixel electrodes, where each of the pixel electrodes includes, a stem electrode extended in a first direction and in a second direction intersecting the first direction to divide the pixel region into quadrants, the quadrants corresponding to first to fourth domains, respectively, a plurality of first branch electrodes extended from the stem electrode in each of the first to fourth domains in a direction oblique to the first direction and the second direction, a plurality of second branch electrodes extended from the stem electrode in each of the first to fourth domains in a direction different from the direction in which the first branch electrodes are extended, a plurality of third branch electrodes extended from the stem electrode in each of the first to fourth domains in a direction different from the directions in which the first branch electrodes and the second branch electrodes are extended, and a first in-between electrode disposed between the first and second branch electrodes, where a width of the first in-between electrode increase sway from the stem electrode, and a spacing distance between the second branch electrodes and the third branch electrodes increases as farther from the stem electrode.

Exemplary embodiments of the invention provide an LCD device including a pixel electrode structure capable of improving visibility.

These and other exemplary embodiments and advantages of the invention will become immediately apparent to those of ordinary skill in the art upon review of the Detailed Description and Claims to follow.

Exemplary embodiments of the invention provide an LCD device including a pixel electrode structure capable of improving visibility.

It should be noted that effects of the invention are not limited to those described above and other effects of the invention will be apparent to those skilled in the art from the following descriptions.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
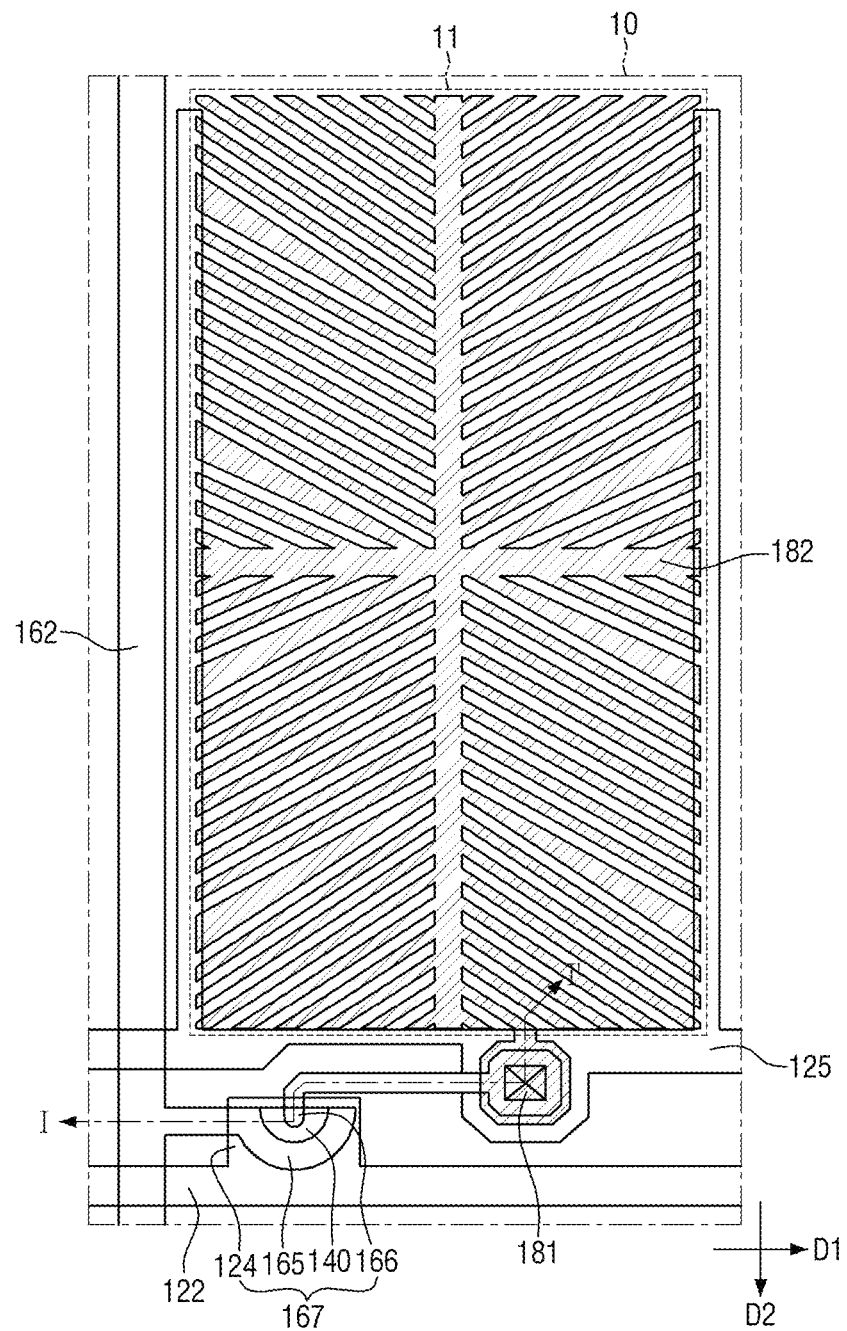
FIG. 1 is a plan diagram of an exemplary embodiment of a single pixel disposed in an LCD device according to the invention.

The invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will be understood that when an element is referred to as being "on" another element, it can be directly on the other element or intervening elements may be therebetween. In contrast, when an element is referred to as being "directly on" another element, there are no intervening elements present.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 2:
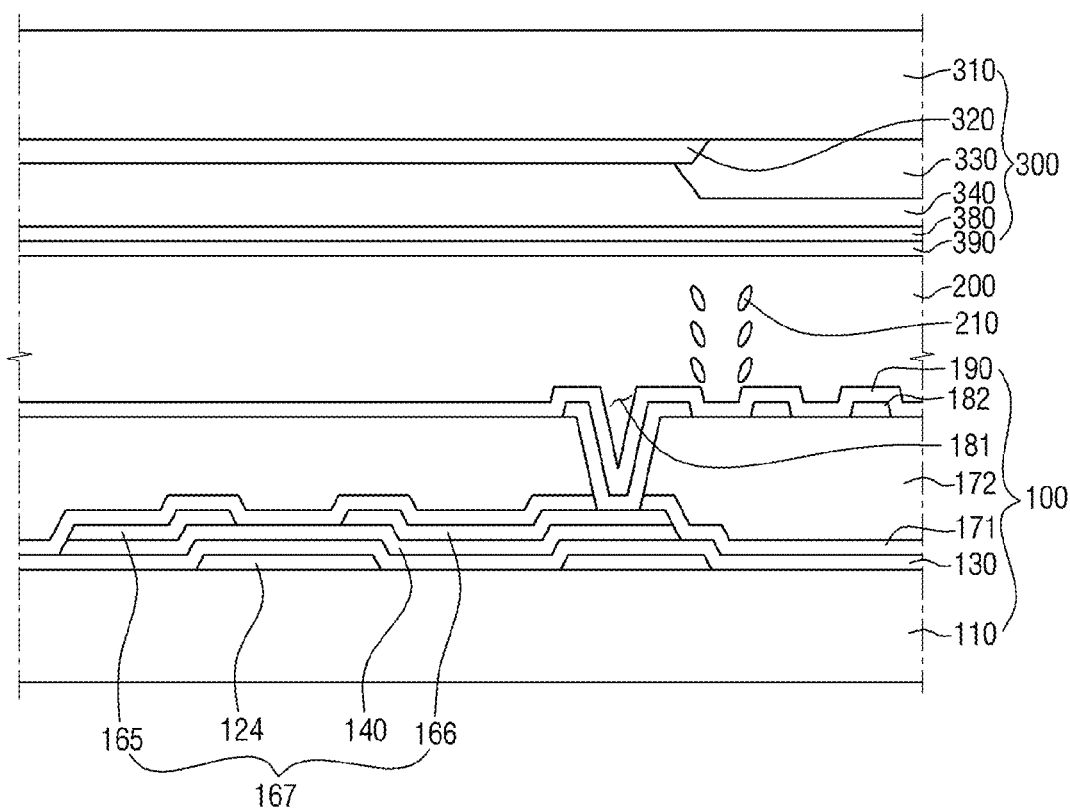
FIG. 2 is a cross-sectional view taken along line I-I' of FIG. 1.
Figure 3:
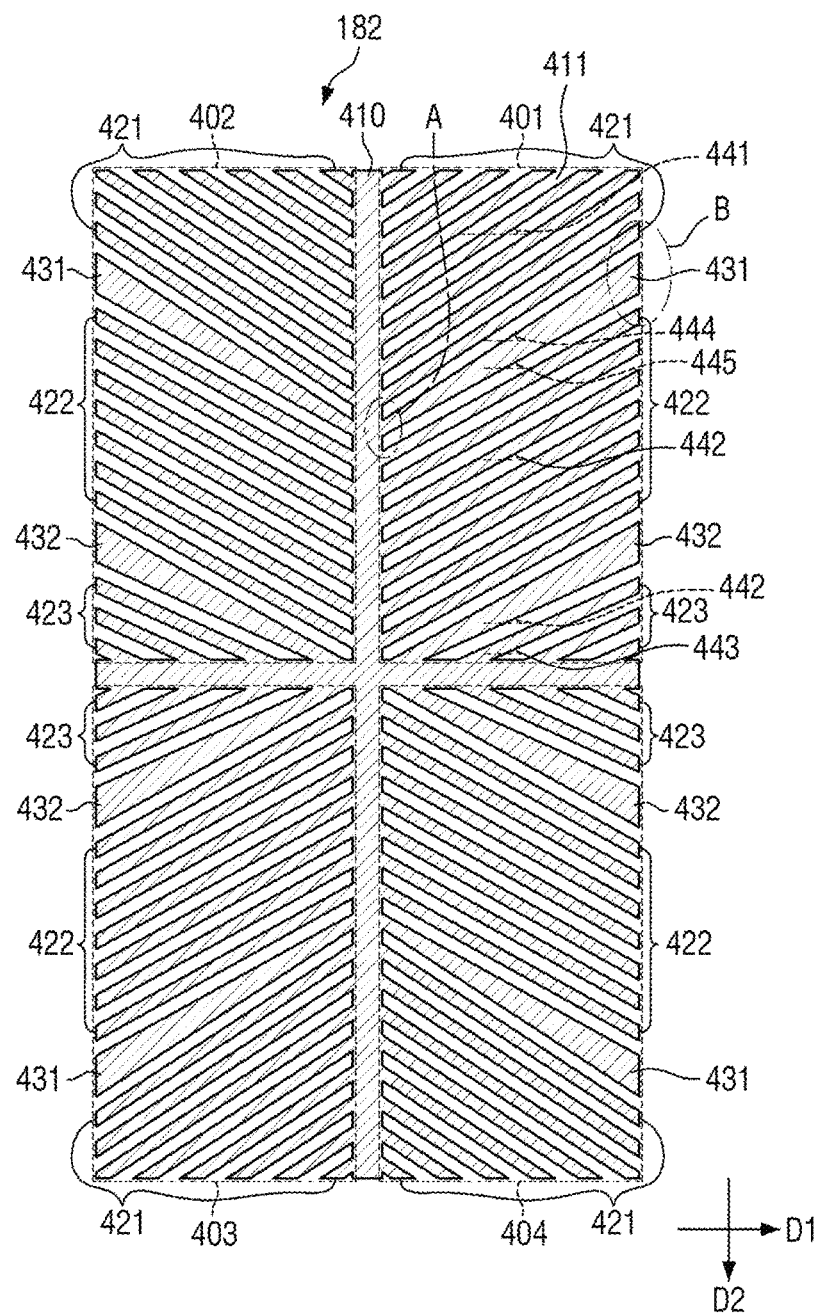
FIG. 3 is an enlarged plan view of a pixel electrode shown in FIG. 1.

FIG. 1 is a plan diagram of a single pixel disposed in an LCD device according to an exemplary embodiment of the invention. FIG. 2 is a cross-sectional view taken along line I-I' of FIG. 1. FIG. 3 is an enlarged plan view of a pixel electrode shown in FIG. 1.

Referring to FIGS. 1 to 3, the LCD device according to the exemplary embodiment of the invention includes an array substrate 100, an opposing substrate 300 and a liquid-crystal layer 200.

On the array substrate 100, a thin-film transistor ("TFT") 167 working as a switching element for supplying data voltage to a pixel electrode 182 is disposed. The opposing substrate 300 is disposed such that it faces the array substrate 100. The liquid-crystal layer 200 is a space between the array substrate 100 and the opposing substrate 300 where liquid crystals 210 are injected.

The LCD device includes pixels 10 arranged in a matrix. The gray scale of the pixels 10 may be individually controlled. Each of the pixels 10 may work as a unit for displaying a color. Each of the pixels 10 includes a pixel region 11 that transmits incident light from the bottom of the array substrate 100 to actually display a color.

Hereinafter, the array substrate 100 will be described.

The array substrate 100 includes a first base substrate 110. The first base substrate 110 may be a transparent insulation substrate. In an exemplary embodiment, the first base substrate 110 may be a glass substrate, a quartz substrate, a transparent resin substrate, etc., for example.

In exemplary embodiments, the first base substrate 110 may be curved in a direction. In other exemplary embodiments, the first base substrate 110 may have flexibility. That is, the first base substrate 110 may be deformable so that it may be rolled, folded, bent and so on.

A plurality of gate lines 122, gate electrodes 124 and holding lines 125 is disposed on the first base substrate 110.

The gate lines 122 delivers a gate signal for controlling the TFT 167 which will be described later. The gate lines 122 may be extended in a first direction D1. As used herein, the first direction D1 refers to a direction extending in parallel with a side of the first base substrate 110. As shown in FIG. 2, the first direction D1 may be defined as a direction indicated by a straight line extending from the left side to the right side. However, the first direction D1 is not limited to being in parallel with a side of the first base substrate 110. The first direction D1 may be a direction indicated by any straight line extending in a direction on the first base substrate 110.

The gate signal may be a signal having a variable voltage value supplied from an external device. The TFT 167 may be turned on/off in response to the voltage value of the gate signal.

The gate electrode 124 may protrude from the gate line 122 and may be an element of the TFT 167 to be described below. One gate line 122 may be connected to a plurality of gate electrodes 124.

The holding lines 125 are disposed between gate lines 122 and are extended generally along the first direction D1. The holding line 125 may be disposed such that it overlaps a part of a pixel electrode 182 to be described and may have a capacitance value with the pixel electrode 182 to thereby prevent rapid voltage drop of voltage charged in the pixel electrode 182. However, the holding line 125 may be eliminated when the voltage drop of the voltage charged in the pixel electrode 182 is relatively good even without the holding line 125.

In an exemplary embodiment, the gate lines 122, the gate electrodes 124 and the holding lines 125 may include an aluminum-based metal such as aluminum (Al) and an aluminum alloy, a silver-based metal such as silver (Ag) and a silver alloy, a gold-based metal such as copper (Cu) and a copper alloy, a molybdenum-based metal such as molybdenum (Mo) and a molybdenum alloy, chrome (Cr), tantalum (Ta), and titanium (Ti). The gate lines 122, the gate electrodes 124 and the holding lines 125 may have a single layer structure. Alternatively, the gate lines 122, the gate electrodes 124 and the holding lines 125 may have a multi-layer structure including at least two conductive films having different physical properties.

A gate insulation film 130 is disposed on the gate lines 122, the gate electrodes 124 and the holding lines 125. The gate insulation film 130 may include an insulative material, for example, silicon nitride or silicon oxide. The gate insulation film 130 may have a single layer structure or may have multi-layer structure including two insulation layers having different physical properties.

A semiconductor layer 140 is disposed on the gate insulation layer 130. The semiconductor layer 140 may overlap at least a part of the gate electrode 124. The semiconductor layer 140 may include amorphous silicon, polycrystalline silicon or oxide semiconductor.

The semiconductor layer 140 may overlap at least a part of or the entirety of a data line 162, a source electrode 165 and a drain electrode 166 to be described later depending on processing steps, as well as the gate electrode 124.

Although not shown in the drawings, in exemplary embodiments, an ohmic contact element may be additionally disposed on the semiconductor layer 140. The ohmic contact element may include n+ hydrogenated amorphous silicon that is highly doped with n-type impurities, or may include silicide. A pair of the ohmic contact elements may be disposed on the semiconductor layer 140. The ohmic contact elements may be disposed between the source electrode 165 and the semiconductor layer 140 and between the drain electrode 166 and semiconductor layer 140, so that the source electrode 165, the drain electrode 166 and semiconductor layer 140 have ohmic contact property.

On the semiconductor layer 140 and the gate insulation film 130, a plurality of data lines 162, the source electrodes 165 and the drain electrodes 166 is disposed.

The data lines 162 may be extended in a second direction D2 to intersect the gate lines 122.

As used herein, the second direction D2 may be a direction intersecting the first direction D1 on the plane. As shown in FIG. 1, the second direction D2 may be a direction indicated by a straight line extending from the upper side to the lower side. However, this is merely illustrative. In another exemplary embodiment, the angle made by the second direction D2 and the first direction D1 may not be right angle. In that case, the second direction D2 may be a direction indicated by a straight line extending not in parallel with the first direction D1.

The data lines 162 may be insulated from the gate lines 122, the gate electrodes 124 and the holding lines 125 by the gate insulation film 130.

The data lines 162 may provide a data signal to the source electrode 165. The data signal may be a signal having a variable voltage value supplied from an external device. The gray scale of each of the pixels 10 may be controlled in response to the data signal.

The source electrode 165 may branch off from the data line 162 and may overlap at least a part of the gate electrode 124.

The drain electrode 166 may be spaced apart from the source electrode 165 on the plane with the semiconductor layer 140 therebetween, and may overlap at least a part of the gate electrode 124. As shown in FIG. 1, the source electrode 165 may have a U-shape and surround the drain electrode 166 with a gap therebetween. However, this is merely illustrative. In an alternative exemplary embodiment, the source electrode 165 may have a rod-like shape such that it may be disposed in parallel with the drain electrode 166 with a gap therefrom.

In addition, the semiconductor layer 140 may also be disposed in an area between the source electrode 165 and the drain electrode 166. That is, the source electrode 165 and the drain electrode 166 may partially overlap or contact the semiconductor layer 140 and may face each other with the semiconductor layer 140 therebetween.

In an exemplary embodiment, the data lines 162, the source electrodes 165 and the drain electrodes 166 may include silver-aluminum, copper, silver, molybdenum, chrome, titanium, tantalum or an alloy thereof, for example. In an exemplary embodiment, the data lines 162, the source electrodes 165 and the drain electrodes 166 may include, but is not limited to, a lower layer (not shown) such as a refractory metal and a low resistance upper layer (not shown) disposed on the lower layer.

The gate electrode 124, the semiconductor layer 140, the source electrode 165 and the drain electrode 166 provide the TFT 167. The TFT 167 may electrically connect the source electrode 165 to the drain electrode 166 in response to a voltage value of the gate signal supplied from the gate electrode 124. Specifically, when the voltage value of the gate signal supplied to the gate electrode 124 reaches the voltage value to turn off the TFT 167, the source electrode 165 and the drain electrode 166 may be electrically insulated from each other. When the voltage value of the gate signal supplied to the gate electrode 124 reaches the voltage value to turn on the TFT 167, the source electrode 165 and the drain electrode 166 may be electrically connected to each other via a channel defined in the semiconductor layer 140 between the source electrode 165 and the drain electrode 166.

The channel may be defined in the semiconductor layer 140 between the source electrode 165 and the drain electrode 166. Specifically, when the TFT 167 is turned on, the channel is defined around the semiconductor layer 140 between the source electrode 165 and the drain electrode 166. The voltage may be transferred from the source electrode 165 to the drain electrode 166 via the channel. The data signal delivered to the drain electrode 166 is delivered to the pixel electrode 182 connected thereto. Accordingly, the data signal may or may not be delivered depending on the gate signal supplied to the gate line 122. The pixel electrode 182 will be described in detail below.

A passivation layer 171 is disposed on the gate insulation layer 130 and the TFT 167. The passivation layer 171 may include an inorganic insulative material and may cover the TFT 167. The passivation layer 171 may protect the TFT 167 from other elements disposed on the TFT 167.

A planarization layer 172 is disposed on the passivation layer 171. The planarization layer 172 may provide a flat surface. The planarization layer 172 may include an organic material. In exemplary embodiments of the invention, the planarization layer 172 may include a photosensitive organic composition. In other exemplary embodiments of the invention, the planarization layer 172 may include a photosensitive organic composition including a pigment for reproducing a color, or an additional photosensitive organic composition layer including a pigment for reproducing a color may be disposed under the planarization layer 172. In either case, the pigment works as a color filter and thus eliminates the necessity of a color filter layer 330 of the opposing substrate 300 to be described later.

In another exemplary embodiment, the passivation layer 171 or the planarization layer 172 may be eliminated.

In the passivation layer 171 and the planarization layer 172, a contact hole may be defined via which a part of the TFT 167, more specifically, a part of the drain electrode 166 is exposed.

The contact hole 181 may vertically penetrate the planarization layer 172 and the passivation layer 171. The contact hole 181 may expose a part of the drain electrode 166 and may overlap the part of the drain electrode 166.

The pixel electrode 182 is disposed on the planarization layer 172. The pixel electrode 182 may be physically connected to the drain electrode 166 via the contact hole 181 and may receive a voltage from the drain electrode 166.

In an exemplary embodiment, the pixel electrode 182 may include a transparent conductive material such as indium tin oxide ("ITO"), indium zinc oxide ("IZO"), indium tin zinc oxide ("ITZO"), and Al-doped zinc oxide ("AZO").

The pixel electrode 182 may be provided such that slits 411 which are open portions are defined in the pixel electrode 182 where no conductive material is disposed. The direction in which liquid crystals 210 disposed on the pixel electrode 182 are tilted may be controlled depending on the shape and pattern of the pixel electrode 182. The pixel electrode 182 may be disposed by forming a pattern largely in the pixel region 11.

The pixel electrode 182 may include a plurality of domains, thereby improving a viewing angle. In an exemplary embodiment, the pixel electrode 182 may include a stem electrode 410, a plurality of first to third branch electrodes 421, 422 and 423, and first and second in-between electrodes 431 and 432, for example.

The stem electrode 410 is extended in the first direction D1 and in the second direction D2 to divide the pixel region 11 into quadrants. Specifically, the pixel region 11 may be divided into a first domain region 401 in Quadrant I, a second domain region 402 in Quadrant II, a third domain region 403 in Quadrant III, and a fourth domain region 404 in Quadrant IV, with respect to coordinate axes of the stem electrode 410.

The first branch electrodes 421 may be extended from the stem electrode 410 obliquely to the first direction D1 and the second direction D2 in each of the first to fourth domains 401, 402, 403 and 404.

The second branch electrodes 422 may be extended from the stem electrode 410 in a direction different from the direction in which the first branch electrodes 421 are extended in each of the first to fourth domains 401, 402, 403 and 404.

The third branch electrodes 422 may be extended from the stem electrode 410 in a direction different from the directions in which the first and second branch electrodes 421 and 422 are extended in each of the first to fourth domains 401, 402, 403 and 404.

The widths of the first to third branch electrodes 421, 422 and 423 taken along a direction perpendicular to an extension direction may be equal to one another.

The first in-between electrode 431 is disposed between the first branch electrodes 421 and the second branch electrodes 422, and the second in-between electrode 432 is disposed between the second branch electrodes 422 and the third branch electrodes 423. The width of each of the first and second in-between electrodes 431 and 432 may increase as farther from the stem electrode 410.

Specifically, the stem electrode 410 may have a cross (+) shape such that it divides the pixel region 11 into four domains 401, 402, 403 and 404 corresponding to quadrants, respectively. By dividing the pixel region 11 into first to fourth domains 401, 402, 403 and 404 to cause the liquid crystals 210 to be tilted in different directions, the viewing angle of the LCD device may be improved. The areas and shapes of the first to fourth domains 401, 402, 403 and 404 may be, but is not limited to, equal to one another.

In each of the first to fourth domains 401, 402, 403 and 404, the first to third branch electrodes 421, 422 and 423 and the first and second in-between electrodes 431 and 432 may be disposed. Firstly, a description will be made with respect to the first domain region 401.

In the first domain region 401, the first branch electrodes 421, the first in-between electrode 431, the second branch electrodes 422, the second in-between electrode 432 and the third branch electrodes 432 may be disposed in this order, adjacent to one another. The first to third branch electrodes 421, 422 and 423 and the first and second in-between electrodes 431 and 432 may be extended from the stem electrode 410 in particular directions. Slits 411 may be defined between them which are open portions where no transparent conductive material is disposed.

The first to third branch electrodes 421, 422 and 423 may be extended in different directions. The first branch electrodes 421 may have a first angle 441 with the first direction D1. The second branch electrodes 422 may have a second angle 442 with the first direction D1. The third branch electrodes 423 may have a third angle 443 with the first direction D1. The second angle 442 may be smaller than the first angle 441 and the third angle 443 may be smaller than the first angle 441. Accordingly, the liquid crystals 210 in the region where the first branch electrodes 421 are disposed, third liquid crystals 210 in the region where the second branch electrodes 422 are disposed, and the liquid crystals 210 in the region where the third branch electrodes 423 are disposed may be controlled such that they are tilted in different directions according to the directions in which the first to third branch electrodes 412, 422 and 423 are extended.

A polarizing plate (not shown) may be disposed on the outer side of each of the array substrate 100 and the opposing substrate 300. As the first to third branch electrodes 421, 422 and 423 are extended in different directions, the polarization axis of the outer polarizing plate of the opposing substrate 300 and the first to third branch electrodes 421, 422 and 423 make three different angles, respectively. Accordingly, the major axes of the tilted liquid-crystals 210 also make three different angles with the polarization axis. As a result, the amount of transmitted light may be controlled in three ways even when the same voltage is applied to the pixel electrode 182, thereby improving visibility.

In an exemplary embodiment, the first angle 441 may be equal to or greater than about 42.5 degrees and less than about 47.5 degrees, the second angle 442 may be equal to or greater than about 37.5 degrees and less than about 42.5 degrees, and the third angle 443 may be equal to or greater than about 32.5 degrees and less than about 37.5 degrees. More preferably, the first angle 441 may be about 45 degrees, the second angle 442 may be about 40 degrees, and the third angle 443 may be about 35 degrees, for example. With the above numerical values, when the polarization axis is in parallel to the first direction D1 and the second direction D2, the transmittance of the region where the first branch electrodes 421 are disposed may be highest, the transmittance of the region where the second branch electrodes 422 are disposed may be lower than the transmittance of the region where the first branch electrodes 421 are disposed, and the transmittance of the region where the third branch electrodes 423 are disposed may be lowest.

The widths of the first to third branch electrodes 421, 422 and 423 may be equal to one another. The width of the slits 411 defined between the first branch electrodes 421, the width of the slits 411 defined between the second branch electrodes 422, and the width of the slits 411 defined between the third branch electrodes 423 taken along a direction perpendicular to an extension direction may be equal to one another.

The first in-between electrode 431 is disposed between the first branch electrodes 421 and the second branch electrodes 422 adjacent to one another. The second in-between electrode 432 is disposed between the second branch electrodes 422 and the third branch electrodes 423 adjacent to one another. That is, the first in-between electrode 431 is disposed between the outermost one of the first branch electrodes 421 that is closest to the second branch electrodes 422 and the outermost one of the second branch electrodes 422 that is closest to the first branch electrodes 421. Similarly, the second in-between electrode 432 is disposed between the outermost one of the second branch electrodes 422 that is closest to the third branch electrodes 423 and the outermost one of the third branch electrodes 423 that is closest to the second branch electrodes 422.

The width of each of the first and second in-between electrodes 431 and 432 may increase in relation to the relative distance from the stem electrode 410. That is, the width of the first in-between electrode 431 may increase as farther from the stem electrode 410.

The width of the slit 411 defined between the first in-between electrode 431 and the first branch electrodes 421 may be constant irrespectively of the distance from the stem electrode 410. In addition, the width of the slit 411 defined between the first in-between electrode 431 and the second branch electrodes 422 may be constant irrespectively of the distance from the stem electrode 410. That is, the side of the first in-between electrode 431 close to the first branch electrodes 421 may be extended in the same direction as the first branch electrodes 421, while the other side of the first in-between electrode 431 close to the second branch electrodes 422 may be extended in the same direction as the second branch electrodes 422.

As the first in-between electrode 431 has such a shape, the first branch electrodes 421 and the second branch electrodes 422 may control corresponding liquid crystals 210 in intended directions without affecting one another. A more detailed description thereof will be made later with reference to FIGS. 4 and 5.

Similarly, the width of the slit 411 defined between the second in-between electrode 432 and the second branch electrodes 422 may be constant irrespectively of the distance from the stem electrode 410. In addition, the width of the slit 411 defined between the second in-between electrode 432 and the third branch electrodes 423 may be constant irrespectively of the distance from the stem electrode 410. That is, the side of the second in-between electrode 432 close to the second branch electrodes 422 may be extended in the same direction as the second branch electrodes 422, while the other side of the second in-between electrode 432 close to the third branch electrodes 423 may be extended in the same direction as the third branch electrodes 423.

As mentioned earlier, the first to third branch electrodes 421, 422 and 423 and the first and second in-between electrodes 431 and 432 may be disposed in each of the second to fourth domains 402, 403 and 404, in addition to the first domain 401. Although the direction in which the first branch electrodes 421 are extended may differ from domains to domains, the angle made by the first branch electrodes 421 and the first direction D1 may be equal to the first angle 441 in all of the domains. This may apply to the second and third branch electrodes 422 and 423, and the first and second in-between electrodes 431 and 432 as well.

A first alignment layer 190 may be disposed on the pixel electrode 182. The first alignment layer 190 may control an initial orientation of the liquid crystals 210 injected into the liquid-crystal layer 200. In another exemplary embodiment, the first alignment layer 190 may be eliminated.

Hereinafter, the opposing substrate 300 will be described.

The opposing substrate 300 may include a second base substrate 310, a light-blocking element 320, a color filter layer 330, a common electrode 380, an overcoat layer 340 and a second alignment layer 390.

The second base substrate 310 may be disposed such that it is opposed to the first base substrate 110. The second base substrate 310 may have durability so that it may withstand external impact. The second base substrate 310 may be a transparent insulation substrate. In an exemplary embodiment, the second base substrate 310 may be a glass substrate, a quartz substrate, a transparent resin substrate, etc., for example. The second base substrate 310 may be either a flat plate or a curved plate in a particular direction. In exemplary embodiments, the second base substrate 310 may have flexibility. That is, the second base substrate 310 may be deformable so that it may be rolled, folded, bent and so on.

The light-blocking element 320 is disposed on (shown as under in FIG. 2) the second base substrate 310. The light-blocking element 320 may overlap the gate lines 122, the holding lines 125, the data lines 162, the TFT 167 and the contact hole 181, i.e., all regions except for the pixel region 11, thereby blocking light transmission.

The color filter layer 330 is disposed on (shown as under in FIG. 2) the second base substrate 310 and the light-blocking element 320. The color filter layer 330 may allow a particular wavelength of a light that comes through the first base substrate 110 to exit via the second base substrate 310 to transmit.

In an exemplary embodiment, the color filter layer 330 may include a photosensitive organic composition including a pigment for reproducing a color and may include one of red, green or blue pigments, for example.

It will be understood that the color filter layer 330 may also be disposed on the first base substrate 110, as described above.

The overcoat layer 340 is disposed on (shown as under in FIG. 2) the light-blocking element 320 and the color filter layer 330. The overcoat layer 340 may reduce level differences between the light-blocking element 320 and the color filter layer 330. In other exemplary embodiments, the overcoat layer 340 may be eliminated.

The common electrode 380 is disposed on (shown as under in FIG. 2) the overcoat layer 340. When there is no overcoat layer 340, the common electrode 380 may be disposed on the light-blocking element 320 and the color filter layer 330. In an exemplary embodiment, the common electrode 380 may include a transparent conductive material such as ITO, IZO, ITZO, and AZO. The common electrode 380 may be provided across the entire surface of the second base substrate 310. The common electrode 380 may receive a common signal from an external device and may generate electric field together with the pixel electrode 182.

The second alignment layer 390 is disposed on (shown as under in FIG. 2) the common electrode 380. The second alignment film 390 may perform similar functionality with the first alignment layer 190 described above. That is, the second alignment layer 390 may control an initial orientation of the liquid crystals 210 injected into the liquid-crystal layer 200.

Hereinafter, the liquid-crystal layer 200 will be described.

The liquid-crystal layer 200 may include liquid crystals 210 having dielectric anisotropy and refractive anisotropy. The liquid crystals 210 may be arranged vertically between the array substrate 100 and the opposing substrate 300. When electric field is applied across the array substrate 100 and the opposing substrate 300, the liquid crystals 210 are rotated or tilted in a particular direction between the array substrate 100 and the opposing substrate 300 to thereby change polarization of light.

Next, the orientation of liquid crystals near the first in-between electrode will be described in detail with reference to FIGS. 4 and 5.

Figure 4:
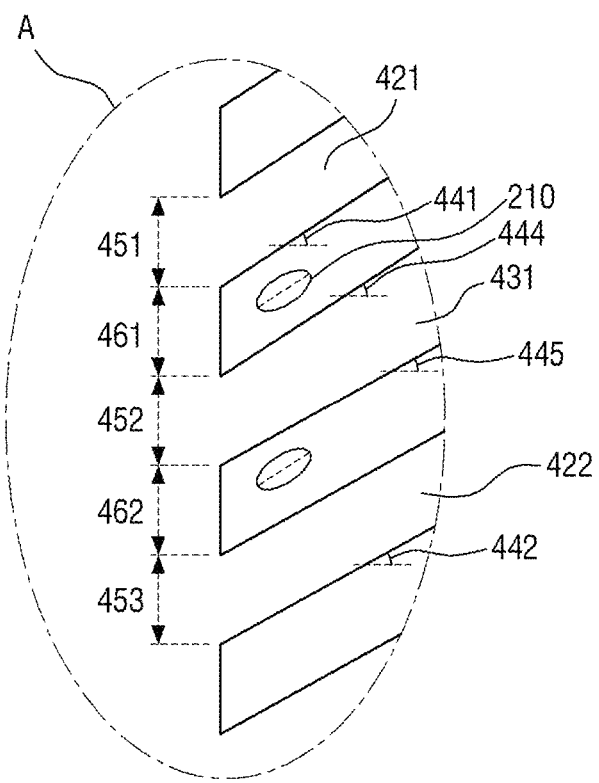
FIG. 4 is an enlarged plan view of portion A shown in FIG. 3.
Figure 5:
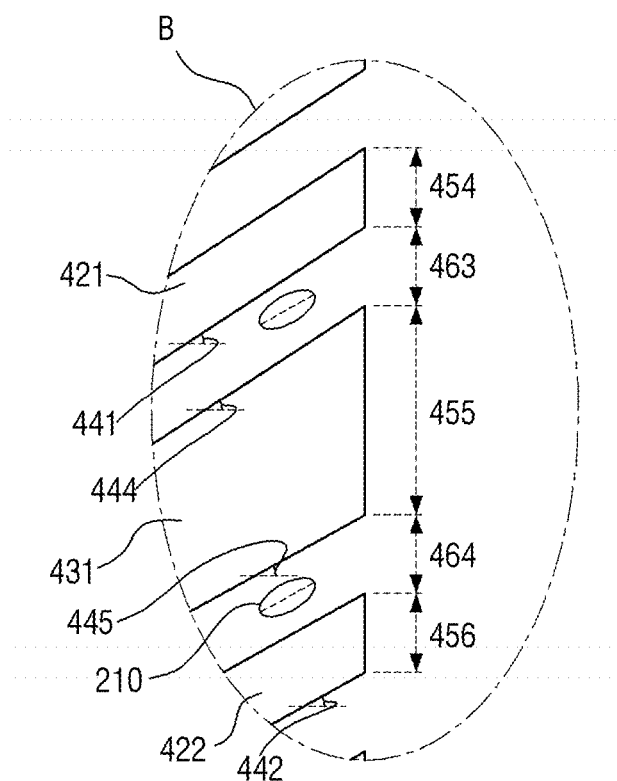
FIG. 5 is an enlarged plan view of portion B shown in FIG. 3.

FIG. 4 is an enlarged plan view of portion A shown in FIG. 3. FIG. 5 is an enlarged plan view of portion B shown in FIG. 3.

FIG. 4 shows portion A where the first in-between electrode 431 is connected to the stem electrode 410. FIG. 5 shows portion B where the end of the first in-between electrode 431 is located that is farthest from the stem electrode 410. Referring to FIGS. 4 and 5, the first branch electrodes 421 are extended to have the first angle 441 with the first direction D1, and the second branch electrodes 422 are extended to have the second angle 442 with the first direction D1.

As described above, the side of the first in-between electrode 431 close to the first branch electrodes 421 may be extended in the same direction as the first branch electrodes 421, while the other side of the first in-between electrode 431 close to the second branch electrodes 422 may be extended in the same direction as the second branch electrodes 422. That is, the side of the first in-between electrode 431 close to the first branch electrodes 421 may have a fourth angle 444 with the first direction D1, and the other side of the first in-between electrode 431 close to the second branch electrodes 422 may have a fifth angle 445 with the first direction D1. The fourth angle 444 may be equal to the first angle 441, and the fifth angle 445 may be equal to the second angle 442.

In addition, a second length 452, which is the width of the first in-between electrode 431 near the stem electrode 410, may be equal to a first length 451, which is the width of the first branch electrode 421 near the stem electrode 410. The second length 452 may also be equal to a third length 453, which is the width of the second branch electrodes 422 near the stem electrode 410. Furthermore, a first spacing distance 461 between the first branch electrodes 421 and the first in-between electrode 431 near the stem electrode 410 may be equal to a second spacing distance 462 between the second branch electrode 422 and the first in-between electrode 431.

A fifth length 455, which is the width of the end of the first in-between electrode 431 that is farthest from the stem electrode 410, may be larger than a fourth length 454, which is the width of the end of the first branch electrodes 421. The fifth length 455 may be larger than a sixth length 456, which is the width of the end of the second branch electrode 422. Even in this case, a third spacing distance 463, which is a spacing distance between the first branch electrodes 421 and the first in-between electrode 431 at the end of the first in-between electrode 431 may be equal to a fourth spacing distance 464, which is a spacing distance between the second branch electrode 422 and the first in-between electrodes 431 at the end of the first in-between electrode 431. Moreover, the first to fourth spacing distances 461, 462, 463 and 464 may be equal to one another.

As the first in-between electrode 431 has such a shape, interference between the first branch electrodes 421 and the second branch electrodes 422 may be minimized. That is, the liquid crystals 210 between the first branch electrodes 421 and the first in-between electrode 431 are tilted toward the direction in which the stem electrode 410 is disposed when electric field is generated, and the directors of the liquid crystals 210 may be tilted to make the first angle 441 with the first direction D1. Likewise, the liquid crystals 210 between the second branch electrodes 422 and the first in-between electrode 431 are tilted toward the direction in which the stem electrode 410 is disposed, and the directors of the liquid crystals 210 may be tilted to make the second angle 442 with the first direction D1.

This may be achieved as the first in-between electrode 431 blocks the first branch electrodes 421 and the second branch electrodes 422 from affecting one another. When there is an open portion without the first in-between electrode 431, the directors of the liquid crystals 210 close to the first in-between electrode 431 are affected by the second branch electrodes 422, such that they are tilted to make an angle smaller than the first angle 441 with the first direction D1. Likewise, when there is an open portion without the first in-between electrode 431, the directors of the liquid crystals 210 close to the second in-between electrode 432 are affected by the first branch electrodes 421, such that they are tilted to make an angle larger than the first angle 442 with the first direction D1. When this happens, the boundary between the region where the first branch electrodes 421 are disposed and the region where the second branch electrodes 422 are disposed becomes blurred, and thus the liquid crystals 210 may not be controlled as a desired direction. By disposing the first in-between electrode 431, however, the direction of the electric field generated in the region where the first branch electrodes 421 are disposed may be clearly distinguished from the direction of the electric field generated in the region where the second branch electrodes 421 are disposed. Accordingly, it is possible to accurately control the liquid crystals 210 in a desired direction. As the first in-between electrode 431 has such a shape, the first branch electrodes 421 and the second branch electrodes 422 may control corresponding liquid crystals 210 in intended directions without affecting one another.

In addition, the intensity of the electric field affecting the region where the first in-between electrode 431 becomes larger due to the voltage applied to the first in-between electrode 431, thereby improving control of the pixel electrode 182 over the liquid crystals 210. Accordingly, it is possible to reduce the number of the liquid-crystals 210 tilted in parallel to the first direction D1 in the region, and thus degree of tilt of the liquid crystals 210 may be increased. Accordingly, the transmittance of the region where the first in-between electrode 431 is disposed may be improved.

In the foregoing description, the movement and effects of the liquid crystals 210 near the first in-between electrode 431 have been described with reference to FIGS. 4 and 5. It will be understood that the description of the first in-between electrode 431 with reference to FIGS. 4 and 5 may equally applied to the second in-between electrode 432, and the second in-between electrode 431 may achieve the same effects as the first in-between electrode 431.

Figure 6:
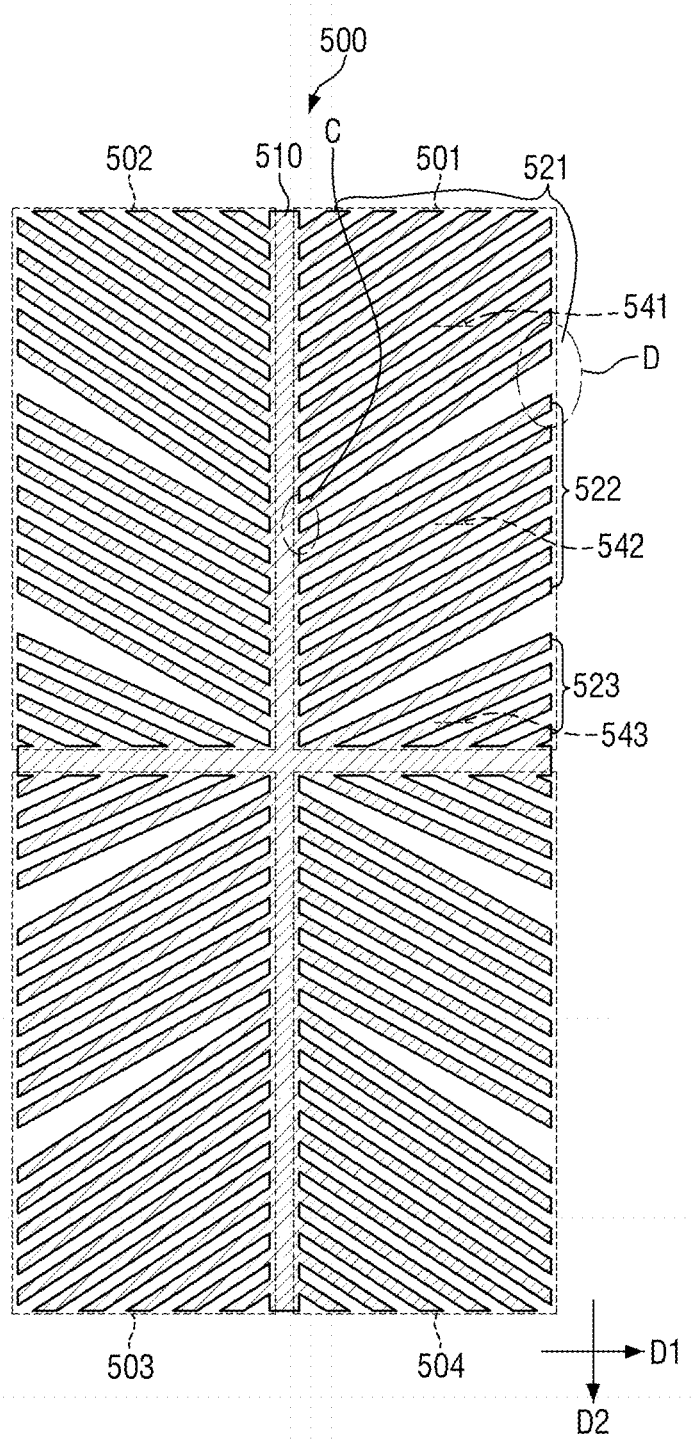
FIG. 6 is an enlarge plan view of another exemplary embodiment of a pixel electrode disposed in a pixel of an LCD device according to the invention.

FIG. 6 is an enlarge plan view of a pixel electrode disposed in a pixel of an LCD device according to another exemplary embodiment of the invention.

In the following description, the same or similar elements will be denoted by the same or similar reference numerals, and redundant descriptions will be omitted or briefly described. Descriptions will be made focusing on differences from the above embodiment.

Referring to FIG. 6, a pixel electrode 500 may include a stem electrode 510, a plurality of first to third branch electrodes 521, 522 and 523.

The stem electrode 510 is extended in the first direction D1 and in the second direction D2 to divide the pixel region 11 (refer to FIG. 1) into quadrants. The pixel region 11 may be divided into a first domain region 501 in Quadrant I, a second domain region 502 in Quadrant II, a third domain region 503 in Quadrant III, and a fourth domain region 504 in Quadrant IV, with respect to coordinate axes of the stem electrode 510.

The first branch electrodes 521 may be extended from the stem electrode 510 obliquely to the first direction D1 and the second direction D2 in each of the first to fourth domain regions 501, 502, 503 and 504.

The second branch electrodes 522 may be extended from the stem electrode 510 in a direction different from the direction in which the first branch electrodes 521 are extended in each of the first to fourth domain regions 501, 502, 503 and 504.

The third branch electrodes 523 may be extended from the stem electrode 510 in a direction different from the directions in which the first and second branch electrodes 521 and 522 are extended in each of the first to fourth domain regions 501, 502, 503 and 504.

The spacing distance between the first branch electrodes 521 and the second electrodes 522 may increase as farther from the stem electrode 510. In addition, the spacing distance between the second branch electrodes 522 and the third branch electrodes 523 may increase as farther from the stem electrode 510.

That is, the pixel electrode 500 according to this exemplary embodiment is different from the pixel electrode according to the exemplary embodiment shown in FIG. 3 in that the pixel electrode 500 does not include the first and second in-between electrodes 431 and 432 but only includes the stem electrode 510, the first to third branch electrodes 521, 522 and 523.

Accordingly, the area between the first branch electrodes 521 and the second branch electrodes 522 may remain as an open portion where no transparent conductive material is disposed. Likewise, the area between the second branch electrodes 522 and the third branch electrodes 523 may remain as an open portion where no transparent conductive material is disposed.

More detailed descriptions thereof will be given with reference to FIGS. 7 and 8.

Figure 7:
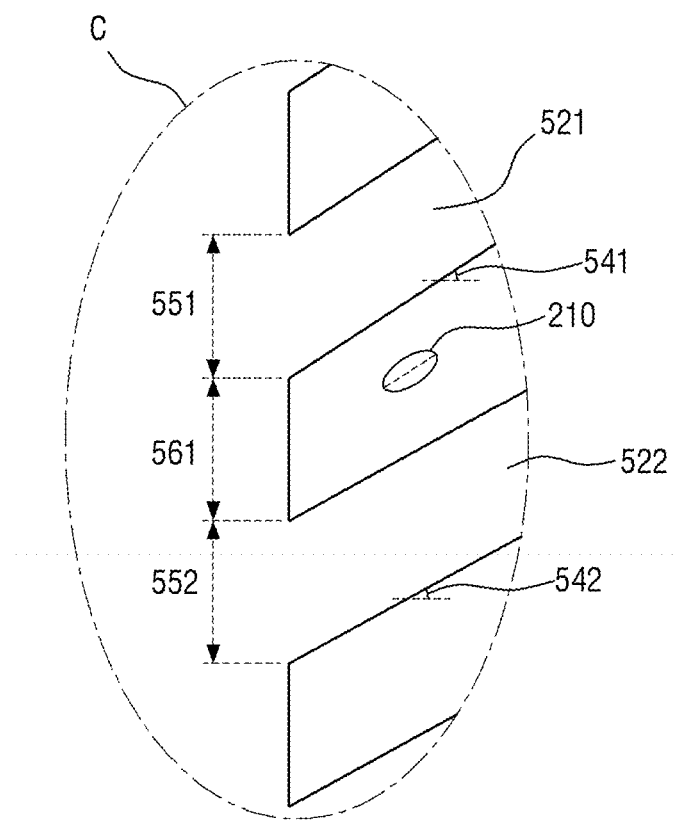
FIG. 7 is an enlarged plan view of portion C shown in FIG. 6.
Figure 8:
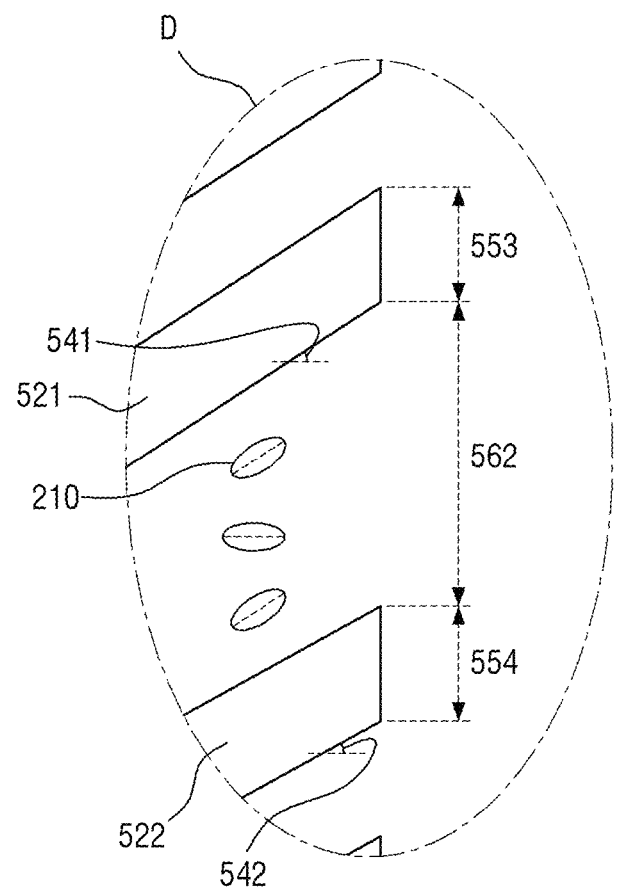
FIG. 8 is an enlarged plan view of portion D shown in FIG. 6.

FIG. 7 is an enlarged plan view of portion C shown in FIG. 6. FIG. 8 is an enlarged plan view of portion D shown in FIG. 6.

FIG. 7 shows portion C where the first branch electrodes 521 and the second branch electrodes 522 are connected to the stem electrode 510. FIG. 8 shows portion D where ends of the first branch electrodes 521 and the second branch electrodes 522 are located that are farthest from the stem electrode 510.

An eleventh length 551, which is the width of the first branch electrodes 521 near the stem electrode 510, may be equal to a twelfth length 552, which is the width of the second branch electrodes 522 near the stem electrode 510. In addition, a thirteenth length 553, which is the width of the ends of the first branch electrodes 521 farthest from the stem electrode 510 may be equal to a fourteenth length 554, which is the width of the ends of the second branch electrodes 522. Furthermore, the width of the first branch electrodes 521 may be equal irrespectively of the distance from the stem electrode 510.

A twelfth length 562, which is a spacing distance between the ends of the first branch electrodes 521 and the ends of the second branch electrodes 522 that are farthest from the stem electrode 510 may be larger than an eleventh distance 561, which is a spacing distance between the first branch electrodes 521 and the second branch electrodes 522 near the stem electrodes 510. That is, the spacing distance between the first branch electrodes 521 and the second electrodes 522 may increase as farther from the stem electrode 510.

As a result, the transmittance of the area between the first branch electrodes 521 and the second branch electrodes 522 may decrease. However, decrease in transmittance at low gray scale is larger than that of high gray scale, and thus visibility may be improved.

Specifically, the liquid crystals 210 between the first branch electrodes 521 and the second branch electrodes 522 are more likely to be affected by the first branch electrodes 521 and the second branch electrodes 522 as the liquid crystals 210 are closer to the stem electrode 510. The liquid crystals 210 between the first branch electrodes 521 and the second branch electrodes 522 are less likely to be affected by the first branch electrodes 521 and the second branch electrodes 522 as they are closer to the ends thereof that are farthest from the stem electrode 510.

Accordingly, the liquid crystals 210 closer to the stem electrode 510 are more likely to be tilted such that the angle of the liquid crystals 210 with the first direction D1 is smaller than the first angle 541 and larger than the second angle 542. The liquid crystals 210 farther from the stem electrode 510 are more likely to be tilted such that the angle of the liquid crystals 210 with the first direction D1 is in parallel with the first direction D1, i.e., smaller than the second angle 542.

In addition, the liquid crystals 210 closer to the stem electrode 510 are more likely to be affected by the first branch electrodes 521 and the second branch electrodes 522 such that the liquid crystals 210 are tilted by a larger angle. The liquid crystals 210 closer to the ends of the first branch electrodes 521 and the second branch electrodes 522 that are farther from the stem electrode 510 are less likely to be affected by the first branch electrodes 521 and the second branch electrodes 522 such that the liquid crystals 210 are tilted by a smaller angle Due to the two factors, the transmittance at low gray scale may be reduced toward the ends of the first branch electrodes 521 and the second branch electrodes 522, thereby improving the visibility.

In the foregoing description, the movement and effects of the liquid crystals 210 between the first branch electrodes 521 and the second branch electrodes 522 have been described with reference to FIGS. 7 and 8. It will be understood that the description given with reference to FIGS. 7 and 8 may equally applied to the area between the second branch electrodes 522 and the third branch electrodes 523 having the third angle 543 with the first direction D1, and the same effects may be achieved also in the area between the second branch electrodes 522 and the third branch electrodes 523.

Figure 9:
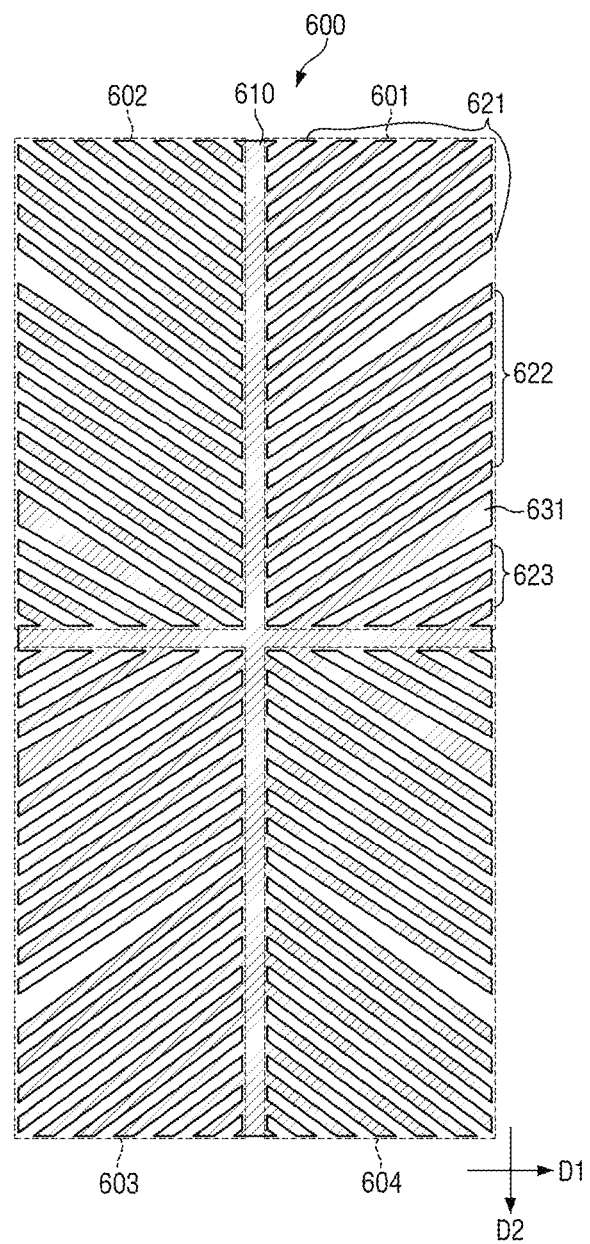
FIG. 9 is an enlarge plan view of another exemplary embodiment of a pixel electrode disposed in a pixel of an LCD device according to the invention.

FIG. 9 is an enlarge plan view of a pixel electrode disposed in a pixel of an LCD device according to another exemplary embodiment of the invention.

In the following description, the same or similar elements will be denoted by the same or similar reference numerals, and redundant descriptions will be omitted or briefly described. Descriptions will be made focusing on differences from the above embodiment.

Referring to FIG. 9, the pixel electrode 600 includes a stem electrode 610 extended in a first direction D1 and in a second direction D2 to divide the pixel region 11 (refer to FIG. 1) into quadrants, the quadrants corresponding to first to fourth domains, respectively, a plurality of first branch electrodes 621 extended from the stem electrode 610 in each of the first to fourth domains 601, 602, 603 and 604 in a direction oblique to the first direction D1 and the second direction D2, a plurality of second branch electrodes 622 extended from the stem electrode 610 in each of the first to fourth domains 601, 602, 603 and 604 in a direction different from the direction in which the first branch electrodes 621 are extended, a plurality of third branch electrodes 623 extended from the stem electrode 610 in each of the first to fourth domains 601, 602, 603 and 604 in a direction different from the directions in which the first branch electrodes 621 and the second branch electrodes 622 are extended, and a first in-between electrode 631 disposed between the second and third branch electrodes 622 and 623. The width of the first in-between electrode 631 may increase as farther from the stem electrode 610. The spacing distance between the second branch electrodes 622 and the third electrodes 623 may increase as farther from the stem electrode 610.

That is, the first in-between electrode 631 is disposed in the area between the second branch electrodes 622 and the third branch electrodes 623 as in the exemplary embodiment shown in FIG. 3, whereas an open portion where no transparent conductive material is disposed is provided in the area between the first branch electrodes 621 and the second branch electrodes 622 as in the exemplary embodiment shown in FIG. 6.

Accordingly, the interference between that the region where the second branch electrodes 622 are disposed and the region where the third branch electrodes 623 are disposed may be blocked so that the liquid-crystals 210 may be controlled accurately, while the open portion is provided in the area between the first branch electrodes 621 and the second branch electrodes 622 so that the visibility may be achieved.

Figure 10:
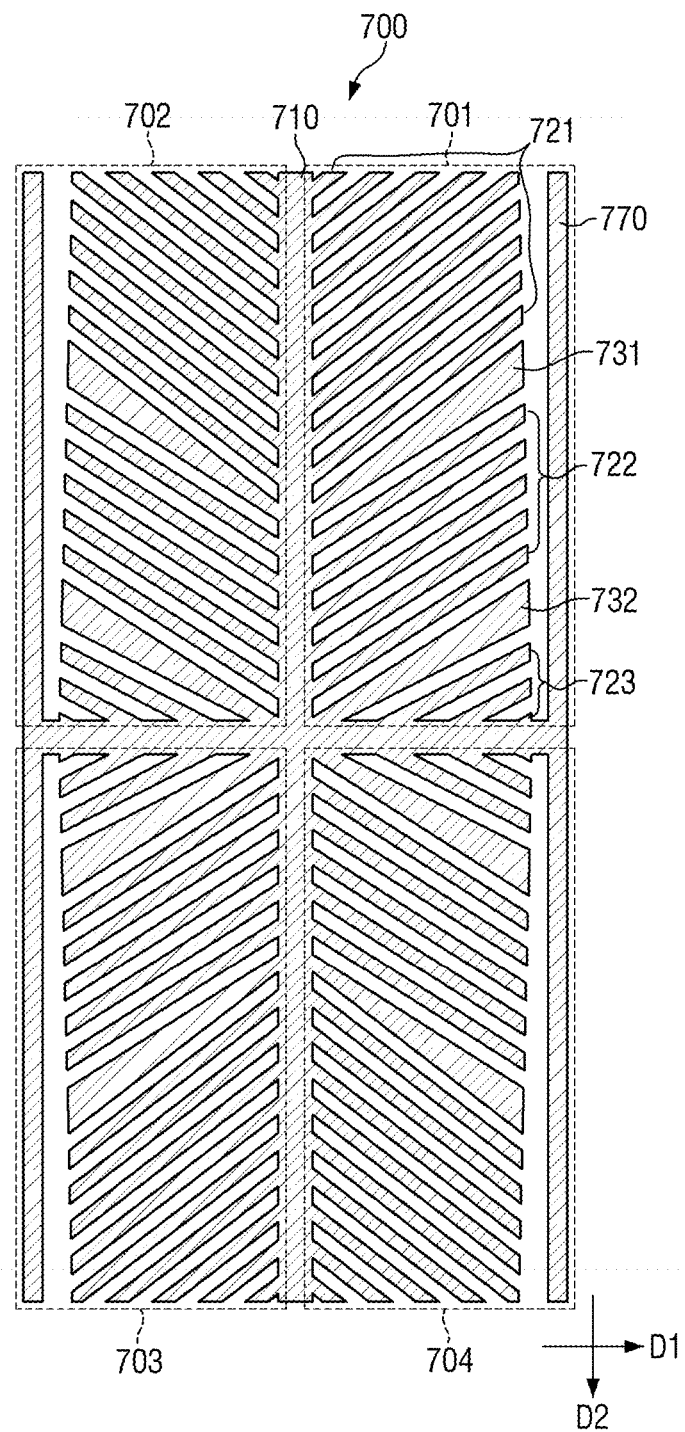
FIG. 10 is an enlarge plan view of another exemplary embodiment of a pixel electrode disposed in a pixel of an LCD device according to the invention.

FIG. 10 is an enlarge plan view of a pixel electrode disposed in a pixel of an LCD device according to another exemplary embodiment of the invention.

In the following description, the same or similar elements will be denoted by the same or similar reference numerals, and redundant descriptions will be omitted or briefly described. Descriptions will be made focusing on differences from the above embodiment.

Compared to the pixel electrode 182 according to the exemplary embodiment shown in FIG. 3, a pixel electrode 700 according to the exemplary embodiment shown in FIG. 10 further includes a rod electrode 770.

The rod electrode 770 may be extended from a stem electrode 710 and disposed along the edge of a pixel region 11 (refer to FIG. 1). Specifically, the rod electrode 770 may be extend from the stem electrode 710, may be spaced apart from the end of each of first to third branch electrodes 721, 722 and 723, first and second in-between electrodes 731 and 732 by a predetermined gap, and may be extended in the second direction D2 along the edge of the pixel region 11. The rod electrode 770 may be disposed in second to fourth domains 702, 703 and 704 in addition to the first domain 701.

Since the rod electrode 770 is extended in the second direction D2, it generates electric field in a direction that is parallel with the first direction D1 and in which the rod electrode 770 is disposed when voltage is applied to the rod electrode 770. As a result, the liquid crystals 210 near the rod electrode 770 may be tilted in the first direction D1. Such effect may be remarkable at low gray scale. Accordingly, the transmittance of the area near the rod electrode 770 at low gray scale may be reduced, thereby improving visibility.

Although the rod electrode 770 is added to the pixel electrode 182 according to the exemplary embodiment shown in FIG. 3, this is not limiting. In an exemplary embodiment, the rod electrode 770 according to this exemplary embodiment may be additionally applied to the pixel electrode 500 according to the exemplary embodiment shown in FIG. 6 or the pixel electrode 600 according to the exemplary embodiment shown in FIG. 9, thereby improving visibility, for example.

Figure 11:
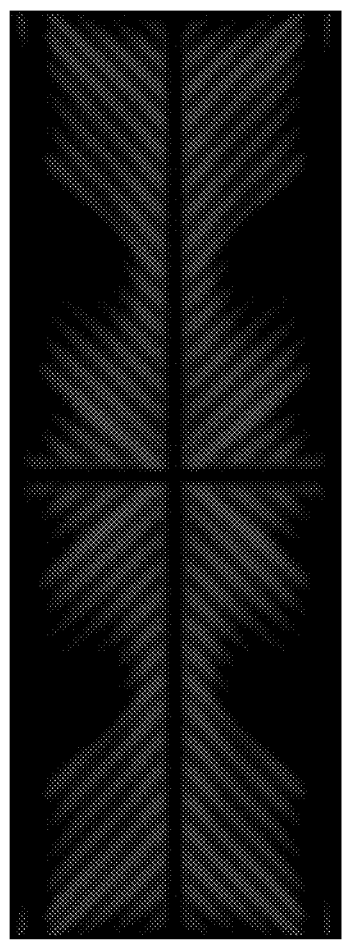
FIG. 11 is a photograph showing transmittance at different domains observed from the front when a first voltage is applied to the pixel electrode shown in FIG. 10.
Figure 12:
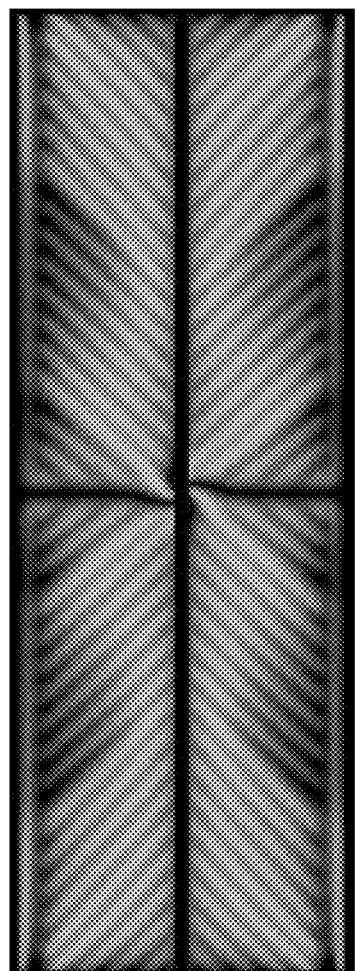
FIG. 12 is a photograph showing transmittance at different domains observed from the front when a second voltage is applied to the pixel electrode shown in FIG. 10.
Figure 13:
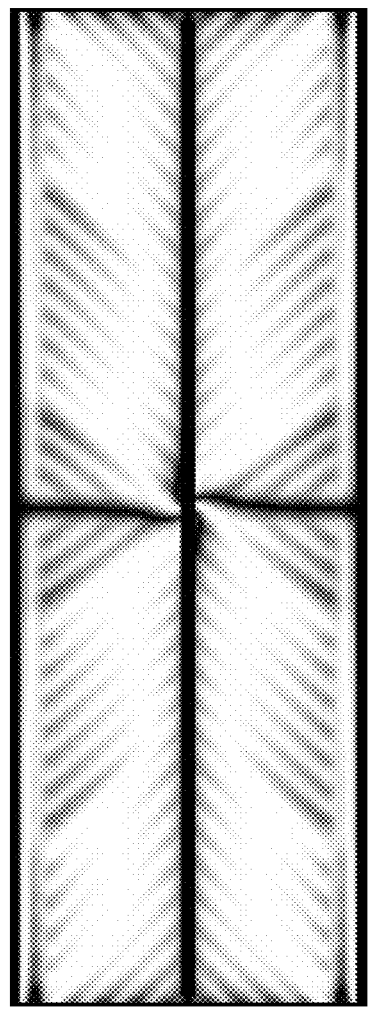
FIG. 13 is a photograph showing transmittance at different domains observed from the front when a third voltage is applied to the pixel electrode shown in FIG. 10.
Figure 14:
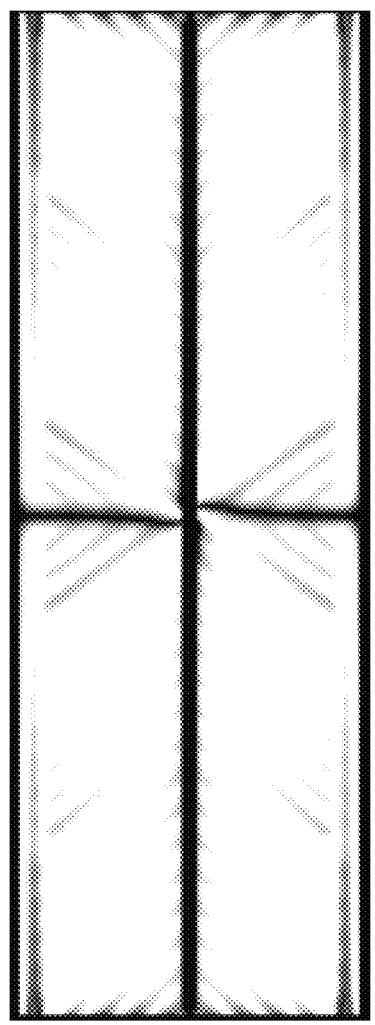
FIG. 14 is a photograph showing transmittance at different domains observed from the front when a fourth voltage is applied to the pixel electrode shown in FIG. 10.

FIG. 11 is a photograph showing transmittance at different domains observed from the front when a first voltage is applied to the pixel electrode shown in FIG. 10. FIG. 12 is a photograph showing transmittance at different domains observed from the front when a second voltage is applied to the pixel electrode shown in FIG. 10. FIG. 13 is a photograph showing transmittance at different domains observed from the front when a third voltage is applied to the pixel electrode shown in FIG. 10. FIG. 14 is a photograph showing transmittance at different domains observed from the front when a fourth voltage is applied to the pixel electrode shown in FIG. 10.

As seen from FIGS. 11 to 14, the transmittance at different domains of the pixel region 11 may vary depending on the voltage applied to the pixel electrode 700.

The second voltage may be larger than the first voltage, the third voltage may be larger than the second voltage, and the fourth voltage may be larger than the third voltage.

In this exemplary embodiment of the invention, the first voltage is about 2.8 volts (V), the second voltage is about 3.4 V, the third voltage is about 5 V, and the fourth voltage is about 8 V.

As seen from FIGS. 11 to 14, the pixel region 11 becomes brighter as the voltage applied to the pixel electrode 700 increases. However, it is seen that certain sizes of dark portions are observed whenever the first to fourth voltages are applied. The size of the dark portion created when the second voltage is applied to the pixel electrode 700 may be larger than the size of the dark portion created when the first voltage is applied to it. Similarly, the size of the dark portion created when the third voltage is applied to the pixel electrode 700 may be larger than the size of the dark portion created when the second voltage is applied to it. Likewise, the size of the dark portion created when the fourth voltage is applied to the pixel electrode 700 may be larger than the size of the dark portion created when the third voltage is applied to it.

That is, the size of the dark portion increases as the gray scale is lower with lower voltage applied to the pixel electrode 700. This is because the area where liquid crystals 210 are tilted in a direction parallel with the first direction D1 increases. Further, decrease in transmittance increases at low gray scale as the area where liquid crystals 210 are tilted in the direction parallel with the first direction D1 increases, and thus it is be seen that the visibility is improved. That is, it is seen that the visibility is improved by employing the pixel electrode 700 shown in FIG. 10.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid-crystal display device comprising:
   a first substrate and a second substrate comprising pixels arranged in a matrix and facing each other;
   a liquid-crystal layer interposed between the first substrate and the second substrate;
   a plurality of pixel electrodes disposed on the first substrate, each of the plurality of pixel electrodes disposed in a pixel region of the respective pixels; and
   a common electrode overlapping the plurality of pixel electrodes, wherein each of the plurality of pixel electrodes comprises:
   a stem electrode extended in a first direction and in a second direction intersecting the first direction to divide the pixel region into quadrants, the quadrants corresponding to first to fourth domains, respectively;
   a plurality of first branch electrodes extended from the stem electrode in each of the first to fourth domains in a direction oblique to the first direction and the second direction;
   a plurality of second branch electrodes extended from the stem electrode in each of the first to fourth domains in a direction different from the direction in which the plurality of first branch electrodes are extended;

a plurality of third branch electrodes extended from the stem electrode in each of the first to fourth domains in a direction different from the directions in which the plurality of first branch electrodes and the plurality of second branch electrodes are extended;

a first in-between electrode disposed between the plurality of first and second branch electrodes; and a second in-between electrode disposed between the plurality of second and third branch electrodes, and wherein widths of the plurality of first to third branch electrodes are equal to one another, and widths of the first and second in-between electrodes increase farther from the stem electrode.

2. The liquid-crystal display device of claim 1, wherein a spacing distance between the first in-between electrode and the plurality of first branch electrodes is equal to a spacing distance between the first in-between electrode and the plurality of second branch electrodes, and wherein a spacing distance between the second in-between electrodes and the plurality of second branch electrodes is equal to a spacing distance between the second in-between electrode and the plurality of third branch electrodes.

3. The liquid-crystal display device of claim 1, wherein the plurality of first branch electrodes has a first angle with the first direction, the plurality of second branch electrodes has a second angle with the first direction, and the plurality of third branch electrodes has a third angle with the first direction, and wherein the second angle is smaller than the first angle, and the third angle is smaller than the second angle.

4. The liquid-crystal display device of claim 3, wherein the first angle is equal to or greater than about 42.5 degrees and less than about 47.5 degrees, the second angle is equal to or greater than about 37.5 degrees and less than about 42.5 degrees, and the third angle is equal to or greater than about 32.5 degrees and less than about 37.5 degrees.

5. The liquid-crystal display device of claim 4, wherein the first angle is about 45 degrees, the second angle is about 40 degrees, and the third angle is about 35degrees.

6. The liquid-crystal display device of claim 1, wherein widths of the first and second in-between electrodes near the stem electrode are equal to the widths of the plurality of first to third branch electrodes.

7. The liquid-crystal display device of claim 6, wherein widths of the first and second in-between electrodes farthest from the stem electrode are larger than the widths of the plurality of first to third branch electrodes.

8. The liquid-crystal display device of claim 1, wherein each of the plurality of pixel electrodes further comprises:

a rod electrode which is extended from the stem electrode to be disposed along an edge of the pixel region.

9. The liquid-crystal display device of claim 1, further comprising:

a plurality of gate lines extended in the first direction on the first substrate;

a plurality of data lines extended in the second direction on the first substrate; and a switching thin-film transistor connected to the gate lines, the data lines and the plurality of pixel electrodes, wherein each of the pixels comprises the single switching thin-film transistor.

10. A liquid-crystal display device comprising:

a first substrate and a second substrate comprising pixels arranged in a matrix and facing each other;

a liquid-crystal layer interposed between the first substrate and the second substrate;

a plurality of pixel electrodes disposed on the first substrate, each of the plurality of pixel electrodes disposed in a pixel region of the respective pixels; and a common electrode overlapping the plurality of pixel electrodes, wherein each of the plurality of pixel electrodes comprises:

a stem electrode extended in a first direction and in a second direction intersecting the first direction to divide the pixel region into quadrants, the quadrants corresponding to first to fourth domains, respectively;

a plurality of first branch electrodes extended from the stem electrode in each of the first to fourth domains in a direction oblique to the first direction and the second direction;

a plurality of second branch electrodes extended from the stem electrode in each of the first to fourth domains in a direction different from the direction in which the plurality of first branch electrodes are extended; and a plurality of third branch electrodes extended from the stem electrode in each of the first to fourth domains in a direction different from the directions in which the plurality of first branch electrodes and the plurality of second branch electrodes are extended, and wherein a spacing distance between the plurality of first branch electrodes and the plurality of second branch electrodes increases farther from the stem electrode, and a spacing distance between the plurality of second branch electrodes and the plurality of third branch electrodes increases farther from the stem electrode.

11. The liquid-crystal display device of claim 10, wherein the plurality of first branch electrodes has a first angle with the first direction, the plurality of second branch electrodes has a second angle with the first direction, and the plurality of third branch electrodes has a third angle with the first direction, and wherein the second angle is smaller than the first angle, and the third angle is smaller than the second angle.

12. The liquid-crystal display device of claim 11, wherein the first angle is equal to or greater than about 42.5 degrees and less than about 47.5 degrees, the second angle is equal to or greater than about 37.5 degrees and less than about 42.5 degrees, and the third angle is equal to or greater than about 32.5 degrees and less than about 37.5degrees.

13. The liquid-crystal display device of claim 12, wherein the first angle is about 45 degrees, the second angle is about 40 degrees, and the third angle is about 35 degrees.

14. The liquid-crystal display device of claim 10, wherein a spacing distance between the plurality of first branch electrodes and the plurality of second branch electrodes farthest from the stem electrode is larger than a spacing distance between the plurality of first branch electrodes and the plurality of second branch electrodes near the stem electrode.

15. The liquid-crystal display device of claim 14, wherein the spacing distance between the plurality of first branch electrodes and the plurality of second branch electrodes near the stem electrode is equal to a spacing distance by which the plurality of first branch electrodes are spaced apart from one another.

16. The liquid-crystal display device of claim 10, wherein each of the pixel electrodes further comprises:

a rod electrode which is extended from the stem electrode to be disposed along an edge of the pixel region.

17. The liquid-crystal display device of claim 10, wherein the liquid-crystal layer further comprises liquid crystals to change polarization of light, and wherein liquid crystals between the plurality of first branch electrodes and the plurality of second branch electrodes are tilted toward the first direction when a first electric field is generated across the liquid-crystal layer, and the liquid crystals between the plurality of first branch electrodes and the plurality of second branch electrodes are tilted toward a direction in which the plurality of first branch electrodes are extended when a second electric field is generated across the liquid-crystal layer, the second electric field being larger than the first electric field.

18. A liquid-crystal display device comprising:
a first substrate and a second substrate comprising pixels arranged in a matrix and facing each other;
a liquid-crystal layer interposed between the first substrate and the second substrate;
a plurality of pixel electrodes disposed on the first substrate, each of the plurality of pixel electrodes disposed in a pixel region of the respective pixels; and
a common electrode overlapping the plurality of pixel electrodes, wherein each of the plurality of pixel electrodes comprises:
a stem electrode extended in a first direction and in a second direction intersecting the first direction to divide the pixel region into quadrants, the quadrants corresponding to first to fourth domains, respectively;
a plurality of first branch electrodes extended from the stem electrode in each of the first to fourth domains in a direction oblique to the first direction and the second direction;
a plurality of second branch electrodes extended from the stem electrode in each of the first to fourth domains in a direction different from the direction in which the plurality of first branch electrodes are extended;
a plurality of third branch electrodes extended from the stem electrode in each of the first to fourth domains in a direction different from the directions in which the plurality of first branch electrodes and the plurality of second branch electrodes are extended; and
a first in-between electrode disposed between the plurality of first and second branch electrodes, wherein a width of the first in-between electrode increases farther from the stem electrode, and a spacing distance between the plurality of second branch electrodes and the plurality of third branch electrodes increases farther from the stem electrode.

19. The liquid-crystal display device of claim 18, wherein a spacing distance between the first in-between electrode and the plurality of first branch electrodes is equal to a spacing distance between the first in-between electrode and the plurality of second branch electrodes, and wherein a spacing distance between the plurality of second branch electrodes and the plurality of third branch electrodes farthest from the stem electrode is larger than a spacing distance between the plurality of second branch electrodes and the plurality of third branch electrodes near the stem electrode.

20. The liquid-crystal display device of claim 18, wherein the plurality of first branch electrodes has a first angle with the first direction, the plurality of second branch electrodes has a second angle with the first direction, and the plurality of third branch electrodes has a third angle with the first direction, and wherein the second angle is smaller than the first angle, and the third angle is smaller than the second angle.

\* \* \* \* \*